Dec. 25, 1956    R. HENNECKE    2,775,487
DEVICE FOR BALANCING VEHICLE ROAD WHEELS
Filed April 8, 1952
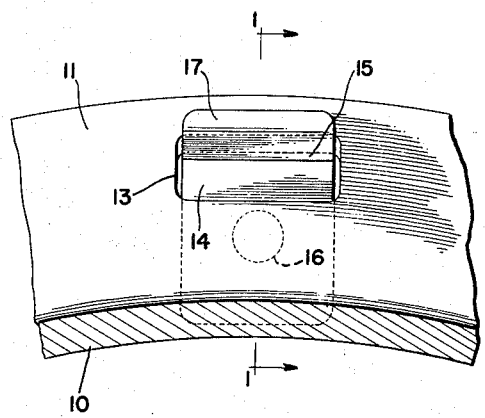
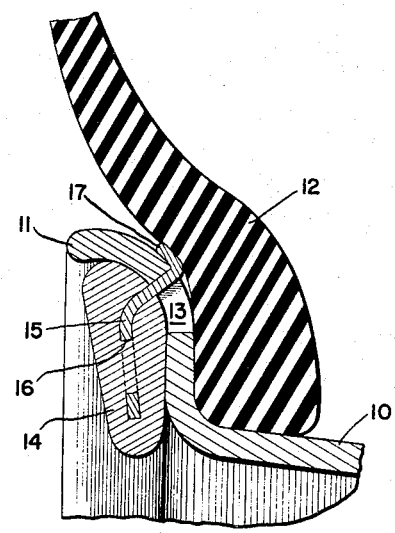
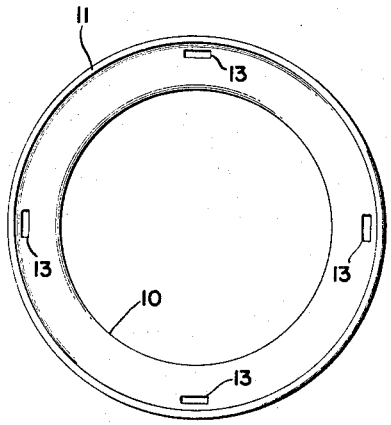
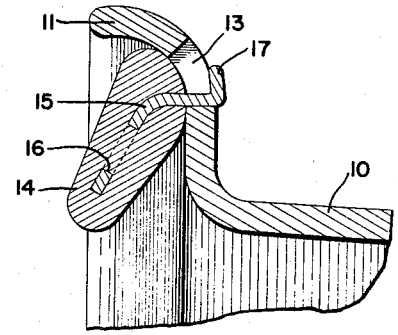
INVENTOR
RUDOLF HENNECKE
BY *Dicke and Padlon*
ATTORNEYS

United States Patent Office 2,775,487
Patented Dec. 25, 1956

2,775,487

DEVICE FOR BALANCING VEHICLE ROAD WHEELS

Rudolf Hennecke, Esslingen (Neckar), Germany, assignor to Daimler-Benz Aktiengesellschaft, Stuttgart-Unterturkheim, Germany Application April 8, 1952, Serial No. 281,197

Claims priority, application Germany April 11, 1951

10 Claims. (Cl. 301—5)

The present invention relates to a device for balancing vehicle wheels under static and dynamic conditions by utilizing weights fastened to the rim of the wheel.

It is, accordingly, an object of the present invention to provide a simple and convenient structure for this purpose.

Another object of the present invention resides in the provision of a balancing weight which may be readily manufactured and which may be installed in a simple manner.

A further object of the present invention is to provide a balancing device which can be readily applied to the vehicle wheels even while the tires are fully inflated, such weights being attached in such a manner as to precude accidental loosening.

Accordingly, a feature of the present invention consists in the provision of a balancing weight having an attachment member located in an opening of the rim, and being kept in its position by the pressure on said member exerted by the tire mounted on the rim. According to a further feature of the present invention the balancing weight is attached to the rim by means of a springy, prefererably hooklike attachment member, held by the tire preferably so that the centrifugal force occurring when driving acts as an increased securing pressure. The attachment members of the balancing weights are preferably cast integrally therewith in a form particularly appropriate for the production and the strength of the balancing weight. According to a further feature of the present invention there are provided several openings in the rim, usually four, spaced 90° apart, for the attaching of the weights.

In the drawing an embodiment of a construction in accordance with the present invention is illustrated, wherein:

Fig. 1 is a section through the rim with a balancing weight affixed thereto taken on line 1—1 of Fig. 2, Fig. 2 is a view of the rim and the weight of Fig. 1 as seen from the right with dismounted tire, Fig. 3 shows the balancing weight in an intermediate position during assembly to the rim, and Fig. 4 is a side view of the rim provided with the several openings in accordance with the present invention.

In the illustration according to Fig. 1 a tire 12 is mounted on the rim 10 formed with edge flange 11. In the rim one or several openings 13 are provided, appropriately four, which are of elongated shape having radially inner and outer edge portions and which are distributed over the circumference of the rim, each spaced at 90°.

A balancing weight 14 is supported in opening 13 by means of a springy blade 15, which is cast into the weight 14 and anchored in it by means of a hole 16 therein filled up by the casting material. The springy blade 15 is formed hooklike at its outer end 17, and is inserted in the opening 13 of the rim with the end 17 extending essentially outwardly of the radially outer edge portion of the opening 13, as illustrated, for instance, in Fig. 3.

The weights may also be simply and quickly attached and removed with a full tire pressure.

The shape of the weight is adapted to the curvature of the rim flange so that it presses closely to the flange, while the springy blade clasps the upper edge of the opening 13. Thus the hooklike end 17 of the blade is tightly pressed to the rim flange by the tire under pressure. Besides, this arrangement causes the weight and the springy blade, owing to the centrifugal force, to be pressed to the rim radially, too, as the road wheel rotates. Thus, the holding forces increase with increase in the driving speed. Furthermore, the arrangement is made so that the weight remains within the outer edge of the rim flange, and does not laterally project beyond rim, so that it cannot be displaced when the wheel strikes an obstacle.

The invention is not intended to be limited to the form shown and described, which is to be understood as illustrative only and not as limiting, as various changes in construction and arrangement may be made, all coming within the scope of the claims which follow.

What I claim is:

1. An arrangement for balancing a vehicle wheel having a rim and a tire mounted contiguous to a side portion of said rim, said rim being provided with at least one opening in said rim portion and said opening having radially inner and outer edge portions, a readily removable weight member having a hook-like attachment member integral with said weight member for balancing said wheel, said opening being of sufficient size to enable insertion and removal of said hook-like attachment member therethrough from the outside of said rim portion, and said hook-like attachment member having a bent end portion extending essentially outwardly of said outer edge portion between said tire and said rim portion to be clamped thereat to a large extent by the pressure of the side of the tire exerted on said rim and retained in position during rotation of the wheel by the centrifugal forces so as to prevent accidental loosening of said weight member while at the same time enabling ready exchange of said weight member.

2. The combination according to claim 1 wherein said weight member is made of cast material and a part of said attachment member is cast into said weight member.

3. The combination according to claim 1, wherein said hook-like attachment member is made of springy material.

4. The combination according to claim 1, wherein said opening is elongated in shape and wherein said hook-like member normally bears against said outer edge portion.

5. In combination with a vehicle wheel having a rim and a tire mounted on the inside of said rim contiguous to at least a portion thereof, said rim being provided with at least one opening in said rim portion adjacent the side edge of said tire, a readily removable weight member having an attachment member formed integrally therewith for balancing said wheel, said attachment member being of hook-like shape and said opening being of sufficiently large size to enable insertion and removal of the hook-like portion of said attachment member therethrough, said weight member being normally secured against accidental loosening by moving the same and therewith said hook-like portion in a direction to position said hook-like portion between said rim portion and said side edge of the tire, said hook-like portion clasping said rim portion in the last-mentioned position and being retained thereat by the pressure of said side portion of the tire whereby said weight member may be readily exchanged at all times.

6. The combination according to claim 5 wherein said rim is provided with a plurality of equi-spaced elongated openings.

7. The combination according to claim 6 wherein said rim is provided with four openings spaced substantially 90 degrees apart from each other over the circumference of the rim.

8. The combination according to claim 1, wherein said rim is provided with a plurality of equi-spaced openings.

9. An arrangement for balancing a vehicle wheel as set forth in claim 1, wherein said rim is formed with an externally concave flange portion, said opening being provided in said flange portion, and wherein said weight member is provided with a convex rear surface conforming substantially to the concave surface of said flange.

10. The combination according to claim 9, wherein said weight member is of such dimension that it does not protrude laterally beyond said flange.

References Cited in the file of this patent

UNITED STATES PATENTS

| | | |
|---|---|---|
| 2,173,321 | Hatch | Sept. 19, 1939 |
| 2,202,129 | Turner | May 28, 1940 |
| 2,218,410 | Weaver | Oct. 15, 1940 |
| 2,329,854 | Rubsam | Sept. 21, 1943 |
| 2,539,517 | Locke | Jan. 30, 1951 |
| 2,585,802 | Loewe | Feb. 12, 1952 |
| 2,631,636 | Chancellor | Mar. 17, 1953 |

FOREIGN PATENTS

| | | |
|---|---|---|
| 282,729 | Great Britain | July 5, 1928 |
| 380,791 | Italy | June 4, 1940 |